United States Patent [19]

Krishnamumar et al.

[11] 4,403,940
[45] Sep. 13, 1983

[54] BLOW HEAD VALVE

[75] Inventors: Suppayan M. Krishnamumar, Nashua; Walter R. Jolly, Merrimack, both of N.H.

[73] Assignee: The Continental Group, Inc., Stamford, Conn.

[21] Appl. No.: 315,843

[22] Filed: Oct. 28, 1981

[51] Int. Cl.³ ............................................. B29C 17/07
[52] U.S. Cl. ..................................... 425/529; 425/535
[58] Field of Search ............... 425/524, 529, 535, 536; 141/291, 351, 352

[56]  References Cited

U.S. PATENT DOCUMENTS

| 738,622 | 9/1903 | Miller | 141/291 |
| 2,261,705 | 11/1941 | Weaver |  |
| 3,850,562 | 11/1974 | Takeuchi et al. | 425/529 X |
| 3,993,427 | 11/1976 | Kauffman et al. | 425/535 X |

Primary Examiner—Jan H. Silbaugh
Attorney, Agent, or Firm—Charles E. Brown

[57]  ABSTRACT

This relates to a blow head to be utilized in combination with a multiple cavity blow mold for introducing blowing gas to the individual preforms positioned within the mold cavities. There is a blow head for each mold cavity and each blow head, although the blow heads are carried by a single blow beam, are actuated to supply blowing gas only if a preform is present within the respective mold cavity. This abstract forms no part of the specification of this application and is not to be construed as limiting the claims of the application.

4 Claims, 3 Drawing Figures

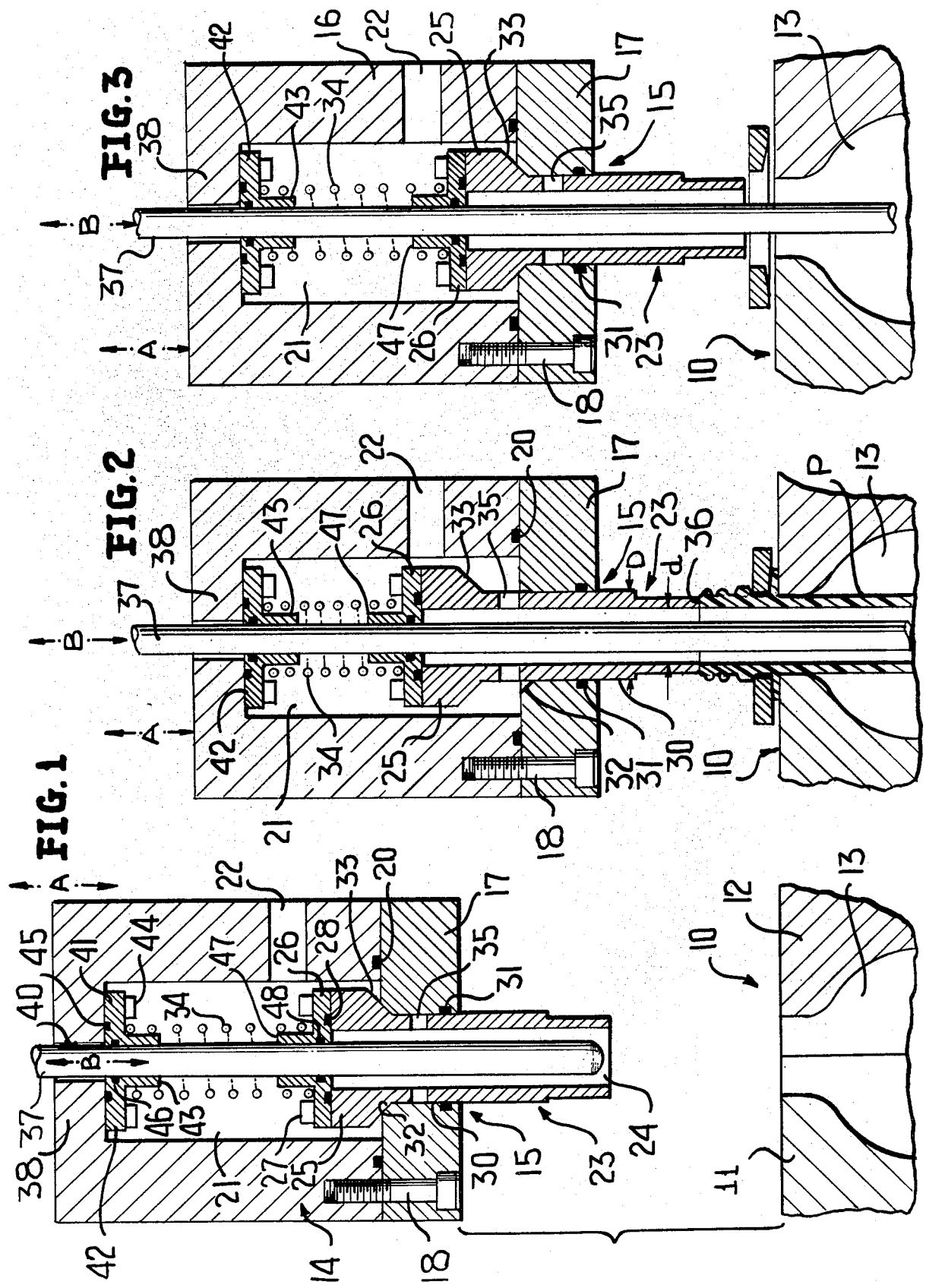

BLOW HEAD VALVE

This invention relates in general to new and useful improvements in blow molding apparatus, and more specifically to a blow head valve for controlling the introduction of a blowing gas into a preform.

Most particularly, the blow head valve in question is of the no preform, no blow type, with the actuation of the valve being effected by a spool of the valve engaging a preform.

In most blow molding apparatus, more than one preform is simultaneously blow molded by means of a blowing gas from a single source. In the absence of one preform, with existing equipment, blowing gas is freely introduced into the empty mold cavity with a resultant reduction of pressure in the blowing gas to all of the preforms. Thus, not only is there a loss of blowing gas by the absence of a preform, but other preforms which are being blow molded are improperly blown and all preforms become scrap.

In accordance with this invention, each blow head is provided with a blow head valve which is actuated solely by the existence of a preform in position in a blow mold associated with the blow head valve, and when there is no preform in the blow mold cavity, no blowing gas or air is directed through that blow head, with the result that not only is there not a loss of the blowing gas, but also all of the preforms in the other cavities of the machine are properly molded.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a transverse vertical sectional view taken through an upper portion of a blow mold and the blow beam, and shows the details of a blow head and the valve carried by the blow beam.

FIG. 2 is a sectional view similar to FIG. 1, and shows the blow beam lowered to a position wherein the blow heads are operative to direct a blowing gas at a high pressure into respective preforms when the preforms are positioned in the mold cavities.

FIG. 3 is a sectional view similar to FIG. 1 with the blow beam in its lowered operative position, and shows the blow head unaffected by the movement of the blow beam due to the absence of a preform in the illustrated mold cavity.

Referring to the drawings in detail, it will be seen that there is illustrated a split blow mold generally identified by the numeral 10 and including mold halves 11 and 12. It is to be understood that the mold halves 11 and 12 are of the multiple cavity type with each cavity being identified by the numeral 13 and being adapted to have received therein a preform. The illustrated cavity is of a configuration for the molding of a bottle and although this is the primary use of the invention, the invention is not so limited.

In order to effect the blow molding of a preform in each cavity 13 of the mold 10, there is provided a blow beam 14 which is in centered overlying relation with respect to the blow mold 10, and which is provided with suitable positioning means generally identified by the letter A for moving the blow beam down into cooperating relation relative to the blow mold and then back to its original position. The blow beam 14 extends longitudinally of the blow mold 10 and is provided with a plurality of blow heads 15, there being one blow head for each of the cavities 13.

As is clearly shown in FIG. 1, the blow beam 14 is in the form of a housing which includes an inverted U-shaped member 16 closed at its lower end by a bottom plate 17 which is secured in place by suitable fasteners 18. The plate 17 is sealed relative to the member 16 by a suitable sealing ring 20.

The blow beam 14 provides a gas (air) chamber 21 for each blow head 15 and, if desired, the chambers may be continuous extensions of one another. A suitable supply port 22 opens into the gas chamber 21 for supplying blowing gas as prescribed in accordance with the blow molding operation to the gas chamber.

Each blow head 15 is primarily formed by a spool 23 which is of a tubular construction and has an open lower end 24. The spool 23 includes an enlarged upper end portion 25 which is closed by a plate 26 which is secured to the spool 23 by fasteners 27 and sealed relative to the spool 23 by a sealing ring 28.

The bottom plate 17 has a central opening 30 through which the spool 23 passes in closely adjacent relation. A sealing ring 31 seals the bottom plate relative to the external surface of the spool 23.

A tapered valve seat 32 is formed in the upper surface of the bottom plate 17 surrounding the opening 30. The enlarged head 25 has a bottom surface which is tapered to form a valve element 33 for seating sealing engagement with the valve seat 32.

A spring 34 constantly urges the spool 23 downwardly through the bottom plate 17 to seat the valve element 33 on the seat 32 and prevent the escape of blowing gas.

It is to be understood that an intermediate portion of the spool 23 has formed therethrough a blow gas port 35 which is normally disposed between the valve defined by the valve seat 32 and the valve element 33 on the one hand and the sealing ring 31 on the other hand. Thus, the port 35 is normally closed, thereby preventing the introduction of blowing gas to the interior of the spool 23.

Referring now to FIG. 2, it will be seen that when the actuating means A moves the blow beam 14 downwardly relative to the blow mold 10 and there is positioned within the cavity 13 a preform P, the lower end of the spool 23 will seat on the upper finish 36 of the preform P in sealed relation. Then, as the blow beam 14 continues to move downwardly, the spool 23 will remain stationary and the bottom wall 17 will move downwardly relative to the spool 23 first to move the valve seat 32 away from the valve element 23 and then to uncover the port 35 so that the interior of the spool 23 is placed in communication with the blowing gas chamber 21 and thus blowing gas may be supplied to the preform P for effecting the blow molding of the preform to the configuration of the mold cavity 13.

It will be apparent upon reviewing FIG. 1 that the spool 23 is initially held against the seat 32 by both the force of the spring 34 and by air pressure within the chamber 21. When the spool 23 is engaged with the preform and the blow beam 14 continues to move down, the spool then becomes unseated from the valve seat 32. As the spool 23 continues to move upwardly, little or no air flows into the preform until the port 35 begins to be uncovered. At this time it is necessary that the seal between the spool and the preform be complete.

The spool is maintained in pressure contact with the preform not only by the force exerted on the spool by the spring 34, but also by the air pressure within the gas chamber 21 acting upon the cross section of the spool which opens into the gas chamber. Most specifically, it will be seen that the spool has a bore diameter d and an external diameter D and that opposing the gas under pressure within the gas chamber 21 is an annular area on which the gas reacts to force the spool downwardly relative to the blow beam 14 and against the preform P and the spool 23 is a combination of the force exerted on the spool by the spring 34 and the force exerted on the cross section of the spool by the blowing gas within the gas chamber 21.

Referring now to FIG. 3, it will be seen that should a cavity 13 be devoid of a preform P when the blow beam 14 moves downwardly the spool 23 will have no abutment element in its way, and as a result the spring 34 will continue to hold the spool 23 fixed relative to the bottom plate 17 and the interior of the spool 23 will not be placed in communication with the blowing gas chamber 21. In other words, if there is no preform, the blow head associated with the particular mold cavity is not operated.

In many blow molding installations, a stretch rod or centering rod 37 is utilized either to preaxially stretch the preform or at least to maintain the lower end of the preform in centered relation with respect to the mold cavity. Such a rod may be utilized in conjunction with the blow head of this invention, and the same is illustrated in the drawings.

In order to accommodate the rod 37, for each mold cavity a top 38 of the blow beam 14 is provided with an opening 40 through which the rod freely passes. On the other hand, there is secured to the underside of the top wall 38 a combined guide and seal element 41 which includes a base 42 and a depending sleeve portion 43. The base is fixedly secured to the underside of the top wall 38 by way of suitable fasteners 44 and is sealed relative thereto by a sealing ring 45. The sleeve portion 43 is sealed relative to the rod 37 by a sealing ring 46. Thus no blowing gas can escape out through the openings 40.

When a rod 37 is utilized, the plast 36 is also provided with an opening therethrough and an integral sleeve portion 47 which projects upwardly. The sleeve portion 47 is sealed relative to the rod 37 by a sealing ring 48.

It is to be understood that the rod 48 is advanced and retracted by separate actuator means indicated by the arrow B. Initially the rod 37 is shown in FIG. 1. However, once the mold has closed and is ready for the blow molding of the preform, the rod 37 advances relative to the blow beam so that at such time as the spool 23 engages the neck finish 36 of the preform, the lower end of the rod will either engage or approach engagement with the bottom of the preform. If the rod 37 is a stretch rod, it will continue to engage the lower end of the preform and serve axially to stretch the preform prior to the introduction of the blowing gas. On the other hand, if the rod is a centering rod, once it touches the lower end of the preform it will advance only at the same rate that the preform is being axially elongated through the introduction of blowing gas.

Although only a preferred embodiment of the blow head and valve construction has been specifically illustrated and described herein, it is to be understood that minor variations may be made in the blow head construction without departing from the spirit and scope of the invention as defined by the appended claims.

We claim:

1. A blow head valve for introducing a high pressure blowing gas into a preform in a blow molding operation, said blow head valve comprising a housing defining a gas chamber, said housing including a bottom wall having an opening therethrough, a tubular spool extending through said opening in sealed relation to said bottom wall, said spool having a closed upper end and an open lower end, said spool upper end being disposed within said gas chamber, resilient means normally retaining said spool in a lowered position, and said spool having a blow gas port opening from the interior thereof through an intermediate portion thereof to the exterior thereof, and said blow gas port normally being closed by said bottom wall, said spool lower end forming means for engaging in sealed relation a preform and for moving said spool into said gas chamber and placing said blow gas port in communication with said gas chamber only in the presence of a preform, the seal between said spool and said bottom wall including an openable valve between said spool and said bottom wall, said valve including a tapered valve seat in said bottom wall surrounding said opening, and a valve member projecting from said spool for seating engagement on said valve seat.

2. A blow head valve according to claim 1 together with a rod of the stretch or centering type extending coaxially with said spool, said rod being movable relative to said housing and said spool and extending in sealed relation through openings in top walls of said housing and said spool.

3. A blow head valve according to claim 2 wherein said rod at least in part forms a guide for said spool.

4. A blow head valve according to claim 3 wherein said spool has a lower portion in the form of a tube which is open at said spool lower end, and wherein when said blow gas port is in communication with said gas chamber gaseous pressure in said gas chamber acts on the cross section of that portion of said tube which enters said gas chamber to force said spool lower end against a preform in addition to the force applied by said resilient means.

* * * * *